H. J. LIVERGOOD.

DUST COLLECTING MACHINE.

No. 11,528. Reissued Mar. 31, 1896.

Witnesses:

Chas. H. Smith.

Mrs E. Ware.

Inventor

Hiram Joseph Livergood.

THE NORRIS PETERS CO., WASHINGTON, D. C.

UNITED STATES PATENT OFFICE.

HIRAM JOSEPH LIVERGOOD, OF JACKSON, MICHIGAN.

DUST-COLLECTING MACHINE.

SPECIFICATION forming part of Reissued Letters Patent No. 11,528, dated March 31, 1896.

Original No. 551,216, dated December 10, 1895. Application for reissue filed March 5, 1896. Serial No. 582,011.

*To all whom it may concern:*

Be it known that I, HIRAM JOSEPH LIVERGOOD, a citizen of the Dominion of Canada, residing at Jackson, in the county of Jackson and State of Michigan, have invented a new and useful Dust-Collecting Machine, of which the following is a specification.

My invention relates to improvements in a machine receiving dust-laden air from an exhaust-fan, then separating the dust from the air and collecting the dust. The dust-laden air is first received from the exhaust-fan into a large settling-chamber having hanging cloth arresters operating with a traveling belt having drags attached thereto for jarring the dust into the conveyer which conveys it out of the collector. In this settling-chamber all the heavy particles of dust are caught. Nothing but the fine particles of dust ascend up in the arched tubular cloth collectors. Therefore they are relieved of a large percentage of work. It has been found in practice that the cloth dust-collector chokes up. The meshes of the cloth become stopped up with the fine pulverulent particles of dust. This causes a back pressure on the fan, reducing the efficiency of the fan and the machine the fan is attached to. I have found the pulverulent dust adhering to the outside of the cloth has the first tendency to stop up the meshes of the cloth. To remove this outside pulverulent dust from the cloth dust-collector, I have designed and arranged a series of vertically-reciprocating traveling soft brushes, operating in conjunction with the vertical round arched cloth tubes, which have a positive motion, traveling up and down the surface of the cloth tubes, keeping the outside of the cloth clean and crinkling the cloth tubes in such a way that should there be any flakes of dust sticking to the inside they will be loosened and forced down out of the tubes into the settling-chamber below. I have designed a simple way of securing the arched tubular cloth collectors to the top of the settling-chamber to permit easy removal for repairs. I attain these objects by the mechanism illustrated in the accompanying drawings, in which—

Figure 1:
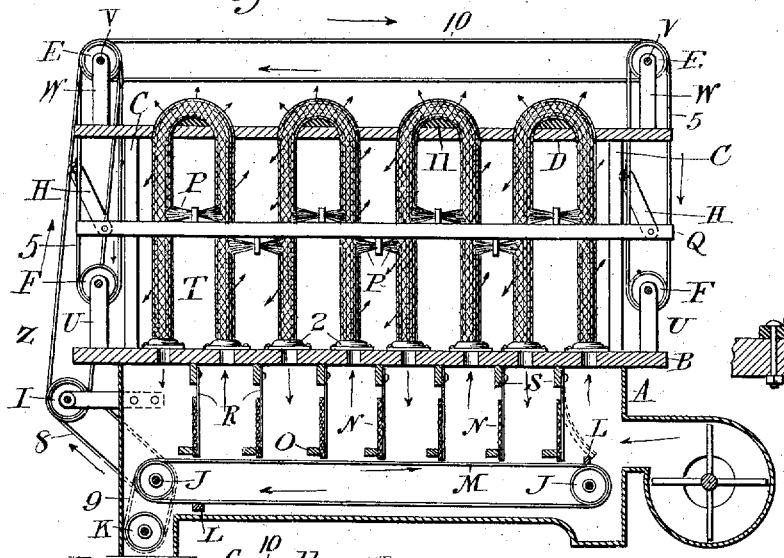
Figure 4:
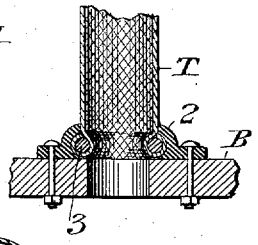
Figure 3:
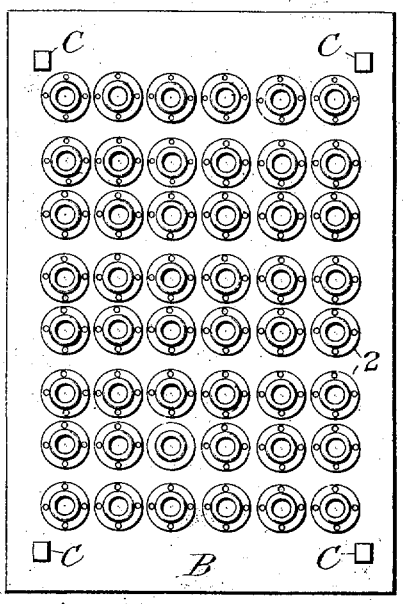
Figure 2:
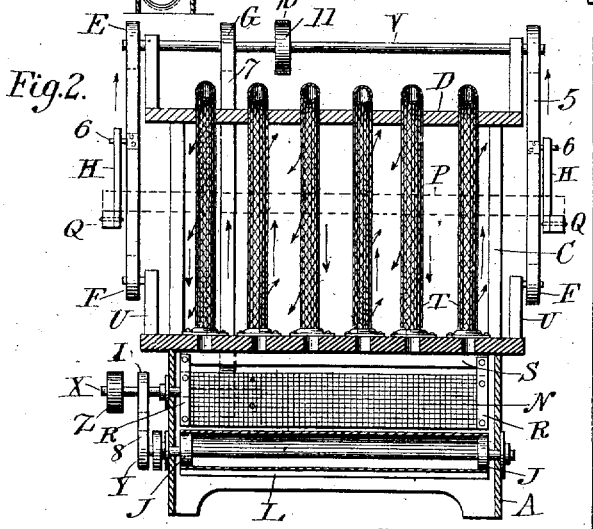
Figure 6:
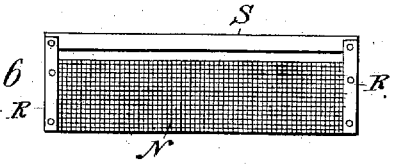
Figure 5:
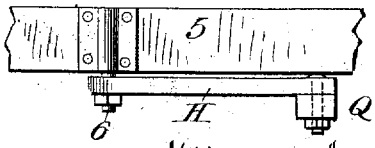

Figure 1 is a vertical longitudinal section of the entire machine. Fig. 2 is a transverse sectional view. Fig. 3 is a plan top view of the deck, to which are fastened the arched tubular cloth collectors by means of the metal plates 2. Fig. 4 is a sectional view showing the hem or loop on the ends of the cloth tubes, also the wire inserted in the hem, the metal plate resting on the wire hoop surrounding the cloth tube and fastened to the top side of the deck. Fig. 5 is a detail view of one of the belts, with the reciprocating attachment fastened to the belt, and which includes one end of the pitman journaled on the projecting pin 6, the other end of the pitman being attached to the parallel brush-bar, this making the connection between the belts, pitman, and brush-bars. Fig. 6 is a detail elevation of one of the dust-arresters, showing the frame and cloth.

Similar letters and figures refer to similar parts throughout the several views.

A is the base of the machine, which consists of a settling-chamber. Arranged in this chamber are the dust-arresters N and the traveling belt M, having the drags L attached thereto, which perform two functions. As the drags L pass along, they come in contact with the lower edge of each of the dust-arresters N and cause the lower edge to go with the belt a certain distance. It then slips off the drag and flies back and strikes the stop O, fastened to the sides of the box A. This jars the dust off the arresters N. It then falls to bottom of the settling-chamber and is caught by the drags L and delivered to the conveyer K, which delivers the dust out of the collector. The cross-supports S may be fastened to the sides of the box A or may be fastened to the under side of the deck B, but preferably to the sides of the box A. To these supports S are attached the flat steel springs R, which carry the dust-arresters N, composed of a coarse open-cloth material. These arresters are arranged in the settling-chamber A for the purpose of forming eddies and arresting all the dust possible in the settling-chamber.

B is the deck or top cover of the box A, perforated full of holes. Over these holes are secured the arched tubular cloth collectors T. These tubes have a hem or loop made on each end. I then slip over the cloth tube T two metal plates 2, and then insert in the hem two wire hoops 3. The metal plates 2 are now fastened to the top of the deck B by screws or other means of fastening. The dust-laden air passes up into the arched tubular cloth collectors T, which are held up in a perpendicular position by the semi-oval cross-pieces 11, resting on the plates D. As the dust-laden air is forced in at one end of the collector by the exhaust-fan, as shown in Fig. 1, the air laden with dust strikes the arresters N, which separates the heavy particles of dust from the air. The air and light particles of dust ascend upward in the arched tubular cloth collectors T, which effect a separation of the light dust from the air, the air passing out through the meshes of the cloth tubes T pure and free from dust. The cloth tubes T, having the arch at the top, give a continuous course to the air, so that as soon as the flakes on the inside of the cloth tubes T are loosened by the brushes P pressing against the surface of the cloth tubes T, traveling up and down them on the outside, the dust is forced down out of the tubes T into the settling-chamber A.

C represents four upright posts, one placed on each corner, resting on the deck B, carrying at the top end the plates D, on which rest the standards W. Journaled in these standards are the shafts V, which have the wheels E secured on their outer ends. Fastened to the deck B, or may be fastened to the post C, are the two brackets U, having projecting journals. Mounted on these journals are the wheels F. Over these wheels E and F pass the belts 5. There are four of these belts, one on each corner of the machine. By this means the brush-bars Q are raised and lowered parallel. Attached to each one of these belts 5 are the attachments 6, having outwardly-projecting pins. Journaled on these pins are the upper ends of the pitmen H. The lower ends of these pitmen H are attached to the parallel side bars Q. Fastened to these parallel side bars Q, running crosswise of the machine, are the brushes P, which pass up and down, pressing against the outside surface of the arched tubular cloth dust-collectors T. By the use of the belts 5, pitmen H, and side bars Q, as shown in Figs. 1 and 2, it will be seen that the brushes P have a positive up-and-down motion.

Z is the driving-pulley, by which the machine will receive its motion from any given source of power.

The shaft X has three pulleys on it—the driving-pulley Z, pulley I, and the pulley on which the belt 7 passes around and up around the pulley G on one of the shafts V, which has four pulleys on it. It will be seen that belt 7 gives motion to shaft V, and a belt 10, passing around pulley 11, gives motion to the other shaft V. These two shafts having the pulleys E on their outward ends give motion to the belts 5, which give a positive reciprocating motion to the brushes P. Belt 8 passes around pulley I and down around a pulley on the shaft J. Belt 9 gives motion to the conveyer K, delivering the dust out of the machine.

Having now described the operation of my dust-collector, I am aware that prior to my invention straight cloth tubes fastened at the top and bottom ends have been made. I therefore do not claim such, broadly; but

What I do claim as my invention, and desire to secure by Letters Patent, is—

1. In a dust-collecting machine, having a settling-chamber, cross-pieces, S, secured in said chamber, A, elastic springs, R, having one end of each spring secured to said cross-pieces, S, and attached to their other ends, the dust-arresters N, adapted to operate in conjunction with the drags, L, on the rotating belt, M, and the stops, O, secured to the sides of the chamber A, substantially as shown, and for the purpose described.

2. In a dust-collecting machine, the round arched tubular cloth collectors, T, loosely supported at the top, resting onto the oval supports, 11, said supports being secured at each end, to the plates, D, the two ends of the round arched tubular cloth dust-collectors, T, being secured to the top side of the perforated deck B, by the metal plates, 2, substantially as shown and for the purpose specified.

3. In a dust-collecting machine, having the round arched tubular cloth dust-collectors, T, the combination of the hem, the hoop 3, metal plates, 2, for securing the cloth tubes, T, to the deck, B, substantially as shown and for the purpose described.

4. In a dust-collecting machine, the shafts, V, standards, W, resting on the plates D, pulleys, E, mounted on the shafts, V, the brackets, U, fastened to the deck B, the pulleys, F, pivotally journaled on said brackets, the belts, 5, adapted to be stretched tight around the pulleys E, and F, being secured to said belts, 5, the attachments, 6, said pins having journaled thereon the upper end of the pitmen H, the lower ends of the pitmen, H, being attached to the parallel side bars, Q, the brushes, P, running crosswise of the machine, and secured at each end to the side bars Q, giving the brushes, P, a positive reciprocating motion against the surface of the cloth tubes, T, substantially as shown for the purpose specified.

HIRAM JOSEPH LIVERGOOD.

Witnesses:
CHAS. H. SMITH,
WM. E. WARE.